United States Patent
Choi

(10) Patent No.: US 6,271,962 B1
(45) Date of Patent: Aug. 7, 2001

(54) SYSTEM OF CONTROLLING WAVELENGTH DIVISION MULTIPLEXED OPTICAL AMPLIFIER AND METHOD THEREOF

(75) Inventor: Doe-in Choi, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/115,919

(22) Filed: Jul. 15, 1998

(30) Foreign Application Priority Data

Jul. 15, 1997 (KR) .................................. 97-32903

(51) Int. Cl.⁷ .......................... H04B 10/08; H04B 10/16; H04J 14/02
(52) U.S. Cl. ................ 359/337.11; 359/179; 359/341.2; 359/341.3
(58) Field of Search .................... 359/110, 177, 359/179, 124, 337, 341

(56) References Cited

U.S. PATENT DOCUMENTS

| | | | |
|---|---|---|---|
| 5,440,418 | 8/1995 | Ishimura et al. | 359/177 |
| 5,500,756 | 3/1996 | Tsushima et al. | 359/174 |
| 5,502,810 | 3/1996 | Watanabe | 359/177 |
| 5,812,289 | * 9/1998 | Tomooka et al. | 359/115 |
| 5,914,794 | * 6/1999 | Fee et al. | 359/110 |
| 6,064,501 | * 5/2000 | Roberts et al. | 359/177 |

FOREIGN PATENT DOCUMENTS

| | | |
|---|---|---|
| 2297212 | 7/1996 | (GB) . |
| 2307092 | 5/1997 | (GB) . |
| 3192827 | 8/1991 | (JP) . |
| 514282 | 1/1993 | (JP) . |
| 5110511 | 4/1993 | (JP) . |
| 9120090 | 5/1997 | (JP) . |
| 9321701 | 12/1997 | (JP) . |
| 411275027 | * 2/1999 | (JP) . |
| 11-74840 | * 3/1999 | (JP) . |
| 411163836 | * 6/1999 | (JP) . |

* cited by examiner

Primary Examiner—Nelson Moskowitz
(74) Attorney, Agent, or Firm—Leydig, Voit & Mayer, Ltd.

(57) ABSTRACT

A wavelength division multiplexed optical amplifier controlling system and method. The wavelength division multiplexed optical amplifier controlling system includes an optical exchange system for generating and interpreting a supervision channel optical signal, multiplexing the supervision channel and data channels including optical signals having different wavelengths, and transmitting and receiving the multiplexed channels. Optical amplifying stages located in a transmission path are connected to the optical exchange system for amplification with uniform gain over a wavelength range including the data channel optical signals, according to information on the supervision channel optical signal. State information concerning amplification are inserted into the supervision channel when the optical exchange system requests the state information. An optical filter at each wavelength is used for supervision in a WDM-EDFA because a supervision channel having a predetermined wavelength is not necessary, so the structure of the WDM-EDFA becomes simpler.

14 Claims, 4 Drawing Sheets

SYSTEM OF CONTROLLING WAVELENGTH DIVISION MULTIPLEXED OPTICAL AMPLIFIER AND METHOD THEREOF

BACKGROUND OF THE INVENTION

1. Field of the Invention

The present invention relates to a system of controlling a wavelength division multiplexed optical amplifier and a method of its operation, and more particularly, to a system of controlling a wavelength division multiplexed optical amplifier for supervising the state of the optical multiplexer and controlling an amplification factor using a supervising channel and a control method for.

2. Description of the Related Art

With the development of the erbium doped fiber amplifier, a type of optical amplifier, enormous growth in the optical transmission field was achieved. Also, with the development of a wavelength division multiplexed system which can transmit four through sixteen channels at the same time as well as a single channel, came the development of a wavelength division multiplexed fiber amplifier (WDM-EDFA).

In general, in the WDM-EDFA, amplification gain must be uniformly maintained at each wavelength since more than four channels must be uniformly amplified at the same time, unlike the case of a single channel, the current of a pump laser diode must be controlled so that there is little change in the amplification gain according to changes in the number of channels (add/drop).

In a conventional optical amplifier control system, the amplification gain is controlled by optical filtering each wavelength or reading channel information sent from the supervising channel to a switching station or a relay station. However, the system structure becomes complicated in order to filter on each wavelength. Accordingly, costs inevitably increase and the volume of the WDM-EDFA increases. Also, there is a technical problem in that filtering should be correctly performed for an interchannel space of 0.8 nm.

To solve the above problem, the supervising channel multiplexed data channels are extracted at the same time by an optical divider. The supervising channel is optically filtered from the extracted 10% of the signal and then examined. However, in such a case, 10% signal loss occurs and it becomes very difficult to input information on the state of the WDM-EDFA to the supervising channel. Namely, synchronization between the WDM-EDFA and a switching system, a multiplexer (MUX), and a demultiplexer (DEMUX) becomes necessary.

SUMMARY OF THE INVENTION

To solve the above problem(s), it is an objective of the present invention to provide a wavelength division multiplexed optical amplifier control system by which it is possible to transfer the state of an optical amplifier to a switching station or a relaying station through a supervising channel and to control the amplification gain of each optical amplifier.

It is another objective of the present invention to provide a system of controlling a wavelength division multiplexed optical amplifier by which it is possible to perform remote supervision and remote control through a shorter path by linking adjacent optical amplifiers and a method control.

To achieve the first objective, there is provided a wavelength division multiplexed optical amplifier controlling system, comprising an optical exchange system for generating and interpreting a supervision channel optical signal, multiplexing the supervision channel and data channels comprised of a plurality of optical signals having different wavelengths, and transmitting and receiving the multiplexed channels and a plurality of optical amplifying portions located on a transmission path connected to the optical exchange system, for performing amplification so as to have even gain with respect to predetermined wavelength range which the data channel optical signal have according to the supervision channel optical signal information, and inserting the state information thereof into the supervision channel when the optical exchange system requests the state information thereof.

To achieve the second objective, there is provided a method for controlling and supervising the optical amplifying portion in the optical exchange system in an optical communication system in which the optical exchange system and the optical amplifying portion are connected to the optical transmission path, using a supervision channel, comprising the steps of (a) multiplexing the supervision channel optical signal having a predetermined form and a data channel optical signal comprised of optical signals having different wavelengths in the optical exchange system and transmitting the multiplexed optical signals, (b) separating the supervision channel from the optical signals multiplexed in the step (a) at the optical amplifier and amplifying the data channel optical signal according to predetermined control information included in the separated supervision channel, (c) converting the state information of the optical amplifying portion into an optical signal, loading the converted optical signal into the supervision channel, combining the supervision channel with the data channel amplified in the step (b), and transmitting the combination result, and (d) demultiplexing the optical signal at the optical exchange system, and checking the state of the optical amplifying portion by interpreting the supervision channel optical signal in the demultiplexed signal.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
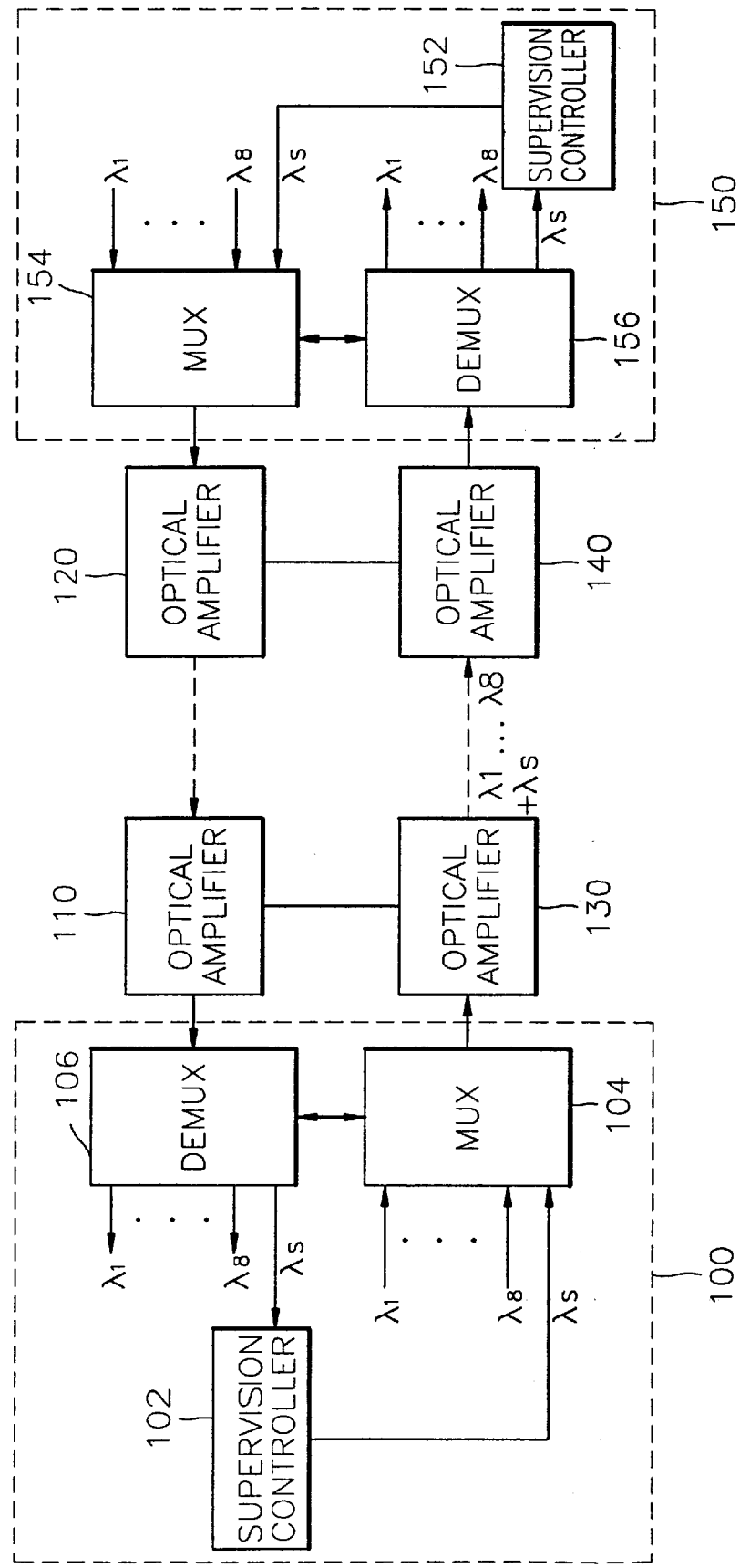
FIG. 1 is a block diagram of a wavelength division multiplexed optical amplifier control system.

Hereinafter, the present invention will be described in more detail with reference to the attached drawings. FIG. 1 is a block diagram of a wavelength division multiplexed optical amplifier control system according to the present invention. The control system shown in FIG. 1 includes a first optical exchange system 100, first, second, third, and fourth WDM-EDFAs 110, 120, 130, and 140, and a second optical exchange system 150. These elements are connected to each other by a bidirectional optical transmission line.

In a general optical communications system, the first optical exchange system 100 is separated from the second optical exchange system 150 by a distance of about 200 km. The first and second optical exchange systems multiplex or demultiplex eight data channels having different wavelengths and a supervising channel, generate a supervising channel signal to be multiplexed, and interpret a divided supervising channel signal. The plurality of first, second, third, and fourth WDM-EDFAs 110, 120, 130, and 140 handle signal transmission bidirectionally between the first and second optical exchange systems 100 and 150 and control the amount of amplification with reference to the data of the supervising channel. Also, when there is a request from the first optical exchange system 100 or the second optical exchange system 150, the WDM-EDFAs construct and transfer the supervising channel signals thereof. At this time, since the first and third WDM-EDFAs 110 and 130 and the second and fourth WDM-EDFAs 120 and 140 are linked to each other in order to shorten the signal path, one optical exchange system can bidirectionally supervise and control all the amplifying portions.

The first and second optical exchange systems 100 and 150 include supervising and controlling portions 102 and 152, multiplexers (MUX) 104 and 154, and demultiplexers (DEMUX) 106 and 156, respectively.

The multiplexers (MUX) 104 and 154 multiplex data channels having eight different wavelengths and a supervising channel having a wavelength that is shorter than those of the data channels. The demultiplexers (DEMUX) 106 and 156 demultiplex the multiplexed optical signals. The supervising and controlling portions 102 and 152 supervise the respective WDM-EDFAs connected to the supervising channels of the MUXs 104 and 154 and the DEMUXs 106 and 156 or construct the supervising channels in order to control the amplification gains of the respective WDM-EDFAs.

Figure 2:
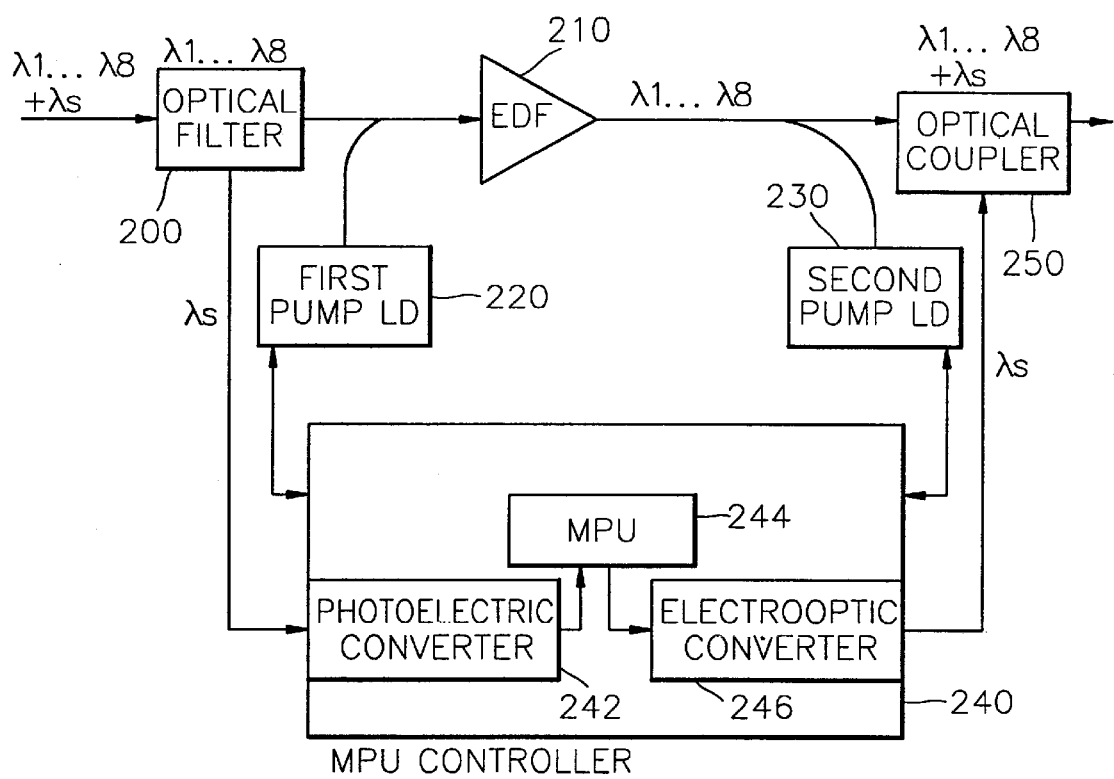
FIG. 2 is a block diagram of the wavelength division multiplexed optical amplifier of FIG. 1.

FIG. 2 is a block diagram of the WDM-EDFAs 110, 120, 130, and 140. Each WDM-EDFA according to FIG. 2 includes an optical filter 200, an erbium doped fiber (EDF) 210 as an optical amplifier, first and second pump light sources 220 and 230 as driving portions our the EDF 210, a micro processor unit (MPU) controller 240, and an optical coupler 250.

The optical filter 200 extracts the supervising channel from the multiplexed optical signal and transmits the optical signals of the remaining data channels. The EDF 210 amplifies the transmitted optical signals of the remaining data channels. The first and second pump light sources 220 and 230 generate pump light for amplifying the data channel optical signal at the EDF 210. The MPU controller 240 converts the supervising channel optical signal extracted by the optical filter 200 into an electrical signal and obtains data required for amplification by the EDF 210. Current is provided to the first and second pump light sources 220 and 230 according to the data and various kinds of state information with respect to the EDF 210 are converted into the optical signals and are output. The optical coupler 250 combines the data channel optical signals amplified by the EDF 210 with the supervising channel optical signal of the MPU controller 240 and transmits the combination result.

The MPU controller 240 is comprises a photoelectric converter 242 such as a photo diode, an MPU 244, and an electrooptic converter 246 such as a distributed feedback laser diode.

The photoelectric converter 242 converts the supervising channel optical signal into an electrical signal. The MPU 244 interprets the supervising channel signal converted into the electrical signal, controls the bias current of the first and second pump light sources 220 and 230 or constructs various kinds of state information of the first and second pump light sources 220 and 230 as the supervising channel data. The electrooptic converter 246 converts the supervising channel data of the MPU 244 into an optical signal and outputs the conversion result.

Figure 3:
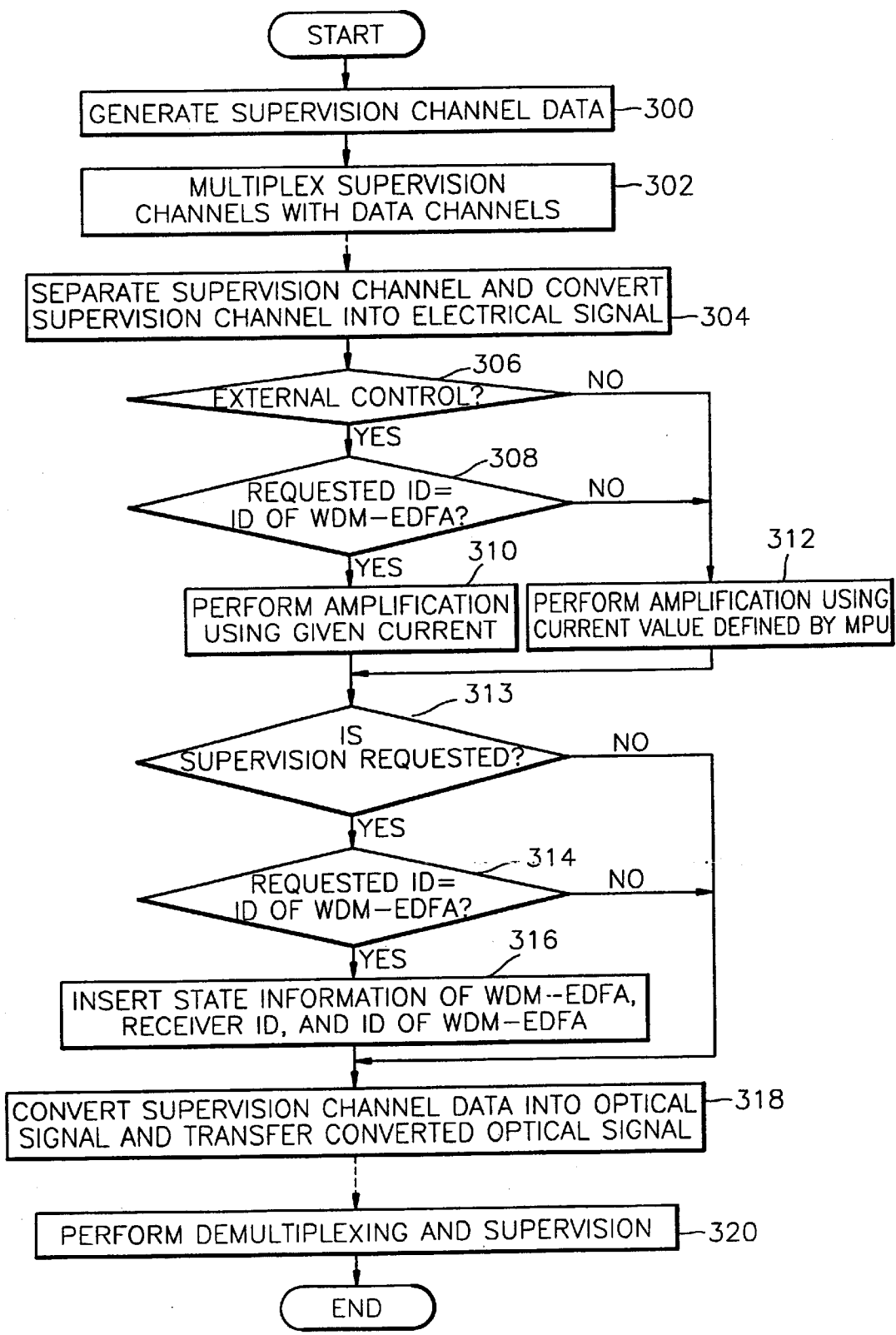
FIG. 3 is a flowchart of a method of controlling a wavelength division multiplexed optical amplifier according to the present invention.
Figure 4:
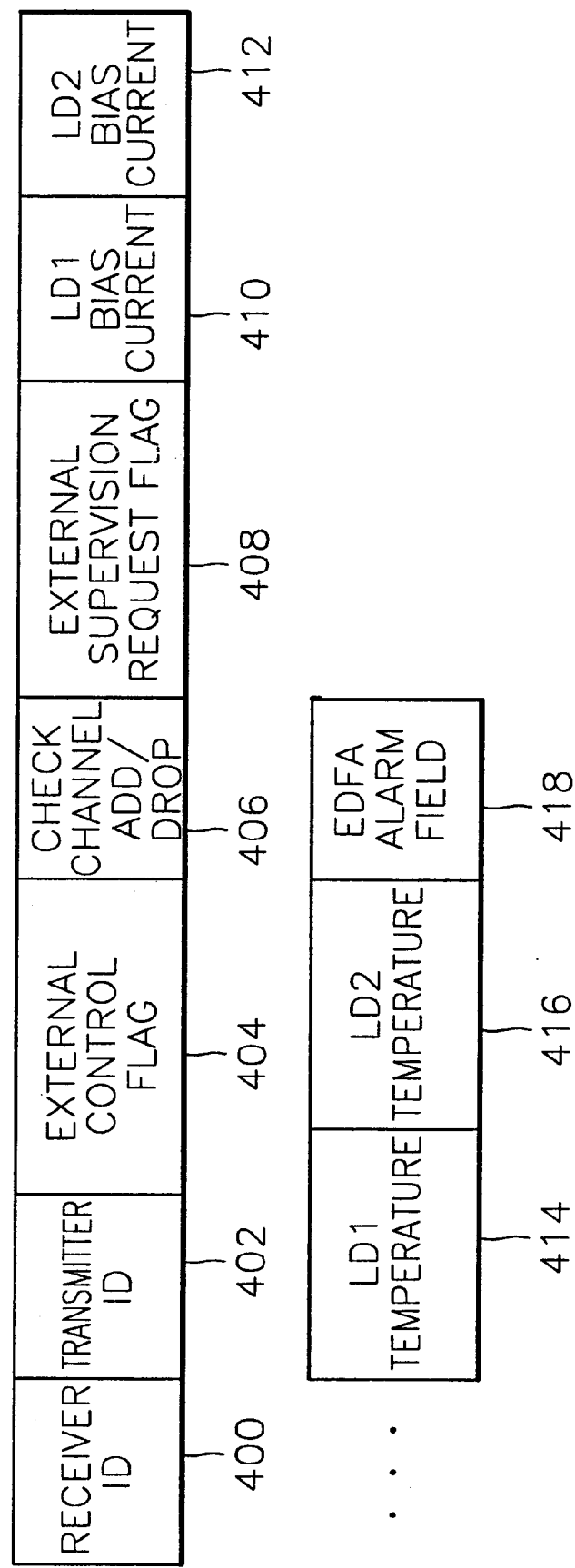
FIG. 4 is a protocol form for controlling the wavelength division multiplexed optical amplifier.

The operation will be described with reference to FIGS. 3 and 4. FIG. 3 is a flow chart illustrating a method of controlling the wavelength division multiplexed optical amplifier according to the present invention. FIG. 4 is a protocol form for controlling the WDM-EDFAs.

IDs are given to the first and second optical exchange systems 100 and 150 and the respective WDM-EDFAs 110, 120, 130, and 140. The supervising channel data having the protocol shown in FIG. 4 is generated in the MUX 104 or 154 of a transmission part of the first and second optical exchange systems 100 and 150 (step 300). The protocol has a form of a receiver port ID 400 of eight bits a transmitter port ID of eight bits an external control flag of one bit, a channel add/drop checking field of eight bits 406, an external supervision request flag of one bit, first pump light source bias current 410, second pump light source bias current of eight bits 412, the temperature 414 of the first pump light source of eight bits, the temperature 416 of the second pump light source of eight bits, and a WDM-EDFA alarm field of six bits.

The transmitting and receiving ports IDs 400 and 402 show calling or called IDs. The external control flag 404 is set to 1 by the optical exchange system when the amplification gain of an arbitrary WDM-EDFA is to be controlled. The channel add/drop checking field 406 indicates the respective channel presences among eight data channels. The external supervision request flag 408 shows whether there is a supervision request from the optical exchange system. When there is a supervision request, the external supervision request flag is set to 1. The first and second pump light source bias currents 401 and 412 show the bias current values of the first and second pump light sources set from the outside in order to control the amplification gain of the WDM-EDFA. The temperatures of the first and second pump light sources show the temperatures of the first and second pump light sources which the WDM-EDFA receives in order to supervise whether the WDM-EDFA is amplified from the outside. The WDM-EDFA alarm field 418 shows whether there is an input or output power supply error in the WDM-EDFA, current supply errors of the first and second pump light sources, and temperature sensing errors of the first and second pump light sources.

The supervision channels generated in the respective WDM-EDFAs are multiplexed with eight data channels through the MUX 104 or 154 and are transferred at a high speed (step 302). In the respective WDM-EDFAs 110, 120, 130, and 140 on an optical transmission path, the optical filter 200 extracts the supervision channel optical signal from the multiplexed optical signals. The photoelectric converter 242 converts the supervision channel optical signal into an electrical signal (step 304). At this time, when an alarm (not shown) is connected to the output terminal of the photoelectric converter 242 as a supervisor of the optical transmission path, giving an alarm when the output power of the photoelectric converter 242 is not less than a threshold value to, it is possible to sense whether the optical transmission path normally operates.

The MPU 244 checks each field of the protocol from the electrical signal converted in the step 304. The check is performed as follows. When the external control flag 404 is 1 (step 306) and the receiver ID 400 is the same as the ID of the WDM-EDFA (step 308) which the MPU 244 associate with the bias current fields 410 and 412 of the first and second pump light sources, those current bias are provided is to the first and second pump light sources 220 and 230 (step 310). When the external control flag 404 is 0 or the receiver ID 400 is different from the ID of its WDM-EDFA, the current value determined in the MPU 244 is supplied to the bias current value of the first and second pump light sources 220 and 230 (step 312). The first and second pump light sources 220 and 230 generate pumping light according to the supplied bias current. The EDF 210 amplifies the data channel optical signal which has passed through the optical filter 200 so as to have an even gain with respect to each wavelength by the pumping light.

After the amplification, the external supervision request flag of the protocol is checked (step 313). When the external supervision request flag 408 is 1 and the receiver ID 400 is the same as the ID of the WDM-EDFA which the MPU 244 check (step 314), the state information of that WDM-EDFA, i.e., the values of the temperature fields 414 and 416 of the first and second pump light sources and the WDM-EDFA alarm field 418 are set and the ID of the location requesting external supervision and the ID of that WDM-EDFA are respectively input to the receiver ID field 400 and the transmitter ID field 402 (step 316). The electrooptic converter 246 converts the set supervision channel data into the optical signal. When the external supervision flag 408 is 0 or the receiver ID 400 is different from the ID of that WDM-EDFA, the above-mentioned protocol data is converted into the optical signal through the electrooptic converter 246 without change.

The optical coupler 250 combines the supervision channel converted into the optical signal with the data channel optical signal amplified by the EDF 210. When there are more WDM-EDFAs on the optical transmission path, the above-mentioned processes are repeated. The data channel optical signal is amplified and the supervision channel optical signal is added to the data channel optical signal, which reaches the optical exchange system 100 or 150.

The DEMUX 106 or 156 in the optical exchange system 100 or 150 demultiplexes the multiplexed data channel optical signal and the supervision channel optical signal. The supervision controlling portion 102 or 152 connected to the supervision channel interprets the supervision channel optical signal and supervises the state of each WDM-EDFA (step 320).

According to the present invention, the structure of the WDM-EDFA becomes simpler by using the supervision channel since an optical filter per each wavelength for supervision in the WDM-EDFA is not necessary. Therefore, it is possible to lower costs and there is no loss in the optical signal which occurs when using a conventional optical demultiplexer. Also, since amplification is not necessary in a supervision channel band due to separating only the supervision channel, processing the supervision channel, converting the supervision channel into the optical signal, and combining the converted optical signal into the optical transmission path, it is possible to ease the burden of flattening the amplification gain of the supervision channel band as, the well as data channel band in the WDM-EDFA and to easily combine the state information of the WDM-EDFA into the optical transmission path. Accordingly, remote supervision and remote control can be achieved. Also, since gain control is performed by sending channel add/drop information to the supervision channel, it is possible to compensate for the time error of the gain control according to the change of channels by the optical exchange system. Accordingly, it is easier to supervise, maintain, and repair IN-LINE WDM-EDFA in an optical communications system.

What is claimed is:

1. A wavelength division multiplexed optical amplifier control system, comprising:

first and second optical exchange systems, each optical exchange system for generating and interpreting a supervision channel optical signal, multiplexing the supervision channel optical signal and a data channel optical signal, comprising a plurality of optical signals having different wavelengths, to produce a multiplexed signal, and transmitting and receiving the multiplexed signal, each optical exchange system comprising:

a multiplexer for multiplexing the supervision channel optical signal and the data channel optical signal to produce the multiplexed signal, a demultiplexer for demultiplexing the multiplexed signal into the data channel optical signal having different wavelengths and the supervision channel optical signal, and a supervision controller for generating the supervision channel optical signal and interpreting the supervision channel optical signal demultiplexed by the demultiplexer; and a plurality of optical amplifying stages, arranged in pairs connected to each other, one of each of the pairs of the optical amplifying stages being arranged in a first transmission path from the first optical exchange system to the second optical exchange system and the other of each pair of optical amplifying stages being arranged in a second transmission path from the second optical exchange system to the first optical exchange system for amplifying with uniform gain, with respect to a wavelength range of the data channel optical signal, according to information in the supervision channel optical signal, and inserting state information into the supervision channel when the optical exchange system requests the state information, the first and second transmission paths providing a bidirectional optical transmission line and connections of the pairs of the optical amplifying stages shortening signal paths whereby a single one of the first and second optical exchange systems can bidirectionally supervise and control all of the amplifying stages.

2. The wavelength division multiplexed optical amplifier control system of claim 1, wherein each of the optical amplifying stages comprises:

an optical filter for transmitting the data channel optical signal from the multiplexed signal and extracting the supervision channel optical signal from the multiplexed signal;

an optical amplifier for amplifying the data channel optical signal which has passed through the optical filter;

a driving portion for controlling gain of the optical amplifier;

a control for converting the supervision channel optical signal extracted by the optical filter into an electrical signal, controlling the driving portion to have a uniform gain with respect to each data channel wavelength, using data included in the electrical signal, and converting the state information into optical information when there is a request by the supervision controller of the optical exchange system; and an optical coupler for combining the data channel optical signal amplified by the optical amplifier with the supervision channel optical signal output by the control.

3. The wavelength division multiplexed amplifier control system of claim 2, wherein the optical amplifier is an erbium added fiber amplifier.

4. The wavelength division multiplexed amplifier control system of claim 2, wherein the driving portion comprises two laser diodes for generating pumping light in response to current values included in the data in the electrical signal.

5. The wavelength division multiplexed amplifier control system of claim 2, wherein the control comprises:
- a photoelectric converter for converting the supervision channel optical signal extracted by the optical filter into the electrical signal;
- a microprocessor for interpreting the electrical signal output from the photoelectric converter and outputting a control signal for supervision and the data included in the electrical signal; and
- an electrooptic converter for converting the data output by the microprocessor into an optical signal.

6. The wavelength division multiplexed optical amplifier control system of claim 5, comprising an optical transmission path supervisor connected to the electrooptic converter and operating when electrical signal power converted by the electrooptic converter at least equals a threshold value, for displaying that the optical transmission path is operating normally.

7. A method of controlling degree of amplification and supervising operation of optical amplifying stages in an optical exchange system, using a supervision channel optical signal in an optical transmission system, the optical transmission system including an optical transmission path connected to the optical exchange system and the optical amplifying stages, the method comprising:

(a) designating optical amplifying stages to be controlled and supervised by the optical exchange system, generating a supervision channel optical signal including the degree of amplification for respective optical amplifying stages and supervision requests for the respective optical amplifying stages, multiplexing the supervision channel optical signal and a data channel optical signal to produce a multiplexed optical signal, and transmitting the multiplexed optical signal;

(b) extracting, at each optical amplifying stage, the supervision channel optical signal from the multiplexed optical signal and converting the supervision channel optical signal so extracted into an electrical signal;

(c) amplifying, at each optical amplifying stage, the data channel optical signal by one of the degree of amplification set by the optical exchange system for the respective optical amplifying state and included in the supervision channel optical signal or by a degree of amplification set by the respective optical amplifying stage itself when the degree of amplification for the respective optical amplifying stage is not included in the supervision channel optical signal;

(d) inserting, at each optical amplifying stage, state information of the respective optical amplifying stage into the electrical signal when the respective optical amplifying stage is designated in a request included in the supervision channel optical signal;

(e) converting, at each optical amplifying stage, the electrical signal into a converted optical signal, multiplexing the converted optical signal with the data channel optical signal amplified by the respective optical amplifying stage to produce a new multiplexed optical signal, and outputting the new multiplexed optical signal; and (f) extracting, in the optical exchange system, the supervision channel optical signal from the new multiplexed optical signal, converting the supervision channel optical signal extracted at the optical exchange system into a second electrical signal, and supervising operation of the optical amplifying stages in response to the second electrical signal.

8. The method of claim 7, wherein, when the optical exchange system does not supervise, but controls a respective amplifying stage, the supervision channel comprises data including:
- a transmitter ID field showing an ID of a device for forming supervision channel data;
- a receiver ID field showing an ID of a device which becomes an object of the supervision channel data;
- a channel add or drop checking field showing added or dropped channels having different waveforms, in the data channel;
- an external control flag set to show whether the optical exchange system controls gain of the respective optical amplifying stage;
- an external supervision request flag showing whether the optical exchange system is not supervising the respective optical amplifying stage; and
- two fields having a value and a number of bits, for controlling the gain of the respective optical amplifying stage.

9. The method of claim 7, wherein, when the optical exchange system does not control but supervises a respective optical amplifying stage, the supervision channel comprises data including:
- a transmitter ID showing an ID of a device for forming supervision channel data;
- a receiver ID showing an ID of a device which becomes an object of the supervision channel data;
- a channel add or drop checking field showing added or dropped channels having different waveforms, in the data channel;
- an external control flag set to show whether the optical exchange device does not control gain of the respective optical amplifying stage;
- an external supervision request flag showing whether the optical exchange device supervises the respective optical amplifying stage; and
- two fields having state information for the respective optical amplifying stage and a fixed number of bits.

10. The method of claim 9, wherein the respective optical amplifying stage controls its amplification gain.

11. The method of claim 7, wherein, when the optical exchange system supervises and controls a respective optical amplifying stage, the supervision channel comprises data including:
- a transmitter ID showing an ID of a device for forming supervision channel data;
- a receiver ID showing an ID of a device which becomes the object of the supervision channel data;
- a channel add or drop checking field showing added or dropped channels having different waveforms, in the data channel;
- an external control flag set to show whether the optical exchange system controls gain of the respective optical amplifying stage;
- an external supervision request flag showing whether the optical exchange system supervises the respective optical amplifying stage;

two fields having a value for controlling the gain of the respective optical amplifying stage and a fixed number of bits; and two fields having the state information of the respective optical amplifying stage and a number of bits.

12. The method of claim 9, wherein the supervision channel data includes an alarm field having a number of bits and showing whether a necessary value is provided to the respective optical amplifying stage and whether the state of the respective optical amplifying stage is sensed.

13. The method of claim 10, wherein the supervision channel data includes an alarm field having a number of bits and showing whether a necessary value is provided to the respective optical amplifying stage and whether the state of the respective optical amplifying stage is sensed.

14. The method of claim 11, wherein the supervision channel data includes an alarm field having a number of bits and showing whether a necessary value is provided to the respective optical amplifying stage and whether the state of the respective optical amplifying stage is sensed.

* * * * *